US009282439B1

(12) United States Patent
Qu et al.

(10) Patent No.: US 9,282,439 B1

(45) Date of Patent: Mar. 8, 2016

(54) SYSTEMS AND METHODS OF WIRELESS DEVICE PUSH-TO-TALK REGISTRATION

(71) Applicant: Sprint Spectrum LP, Overland Park, KS (US)

(72) Inventors: Jing Qu, Sterling, VA (US); Stephanie Teng-Ossman, Vienna, VA (US); Thomas Riedel, Springfield, VA (US); Greg Leong, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 308 days.

(21) Appl. No.: 13/887,111

(22) Filed: May 3, 2013

(51) Int. Cl.

*H04W 4/10* (2009.01)
*H04W 8/18* (2009.01)
*H04W 4/08* (2009.01)

(52) U.S. Cl.

CPC .................................... *H04W 4/08* (2013.01)

(58) Field of Classification Search

None

See application file for complete search history.

(56) References Cited

U.S. PATENT DOCUMENTS

| | | | | |
|---|---|---|---|---|
| 8,271,685 | B1 | 9/2012 | Reeves et al. | |
| 2007/0038723 | A1* | 2/2007 | Gourraud | 709/218 |
| 2007/0100981 | A1* | 5/2007 | Adamczyk et al. | 709/223 |
| 2014/0228019 | A1* | 8/2014 | Mannepally | 455/433 |

* cited by examiner

*Primary Examiner* — Philip Sobutka

(57) ABSTRACT

In systems and methods of managing push-to-talk registration of a wireless device, a network attachment request is received from a wireless device in a first geographic service area, a service plan identifier associated with the wireless device is received, and based on the service plan identifier a domain name node network address is provided to the wireless device. A network address of a push-to-talk application node associated with a second geographic service area is determined based on the domain name node network address. The wireless device is then registered in the first geographic service area with the push-to-talk application node associated with the second geographic service area.

19 Claims, 6 Drawing Sheets

RECEIVE NETWORK ATTACHMENT REQUEST — 202

RECEIVE SERVICE PLAN IDENTIFIER — 204

PROVIDE DOMAIN NAME SERVER NETWORK ADDRESS — 206

DETERMINE PTT APPLICATION SERVER NETWORK ADDRESS — 208

REGISTER WIRELESS DEVICE WITH PTT APPLICATION SERVER — 210

SYSTEMS AND METHODS OF WIRELESS DEVICE PUSH-TO-TALK REGISTRATION

TECHNICAL BACKGROUND

To establish communication with a wireless communication unit, a wireless device typically requests authentication and is registered by a communication system. Communications systems can typically support interconnect and push-to-talk communications as well as a variety of data services. Interconnect communications are typically full-duplex communications, such as a two-way telephone call. Push-to-talk communications, also called dispatch communications, are typically half-duplex communications, such as walkie-talkie and one-way radio communications.

When a wireless device registers in a push-to-talk communication system, the wireless device is typically registered with an application node (such as an application server or similar network element) in the same geographic service region. This registration process can introduce delay where wireless devices participate in a group call, because call completion can require communication across potentially geographically dispersed systems to locate and establish communication with each member of the group call.

OVERVIEW

In operation, a network attachment request is received from a wireless device in a first geographic service area. A service plan identifier associated with the wireless device is received, and based on the service plan identifier a domain name node network address is provided to the wireless device. A push-to-talk application node network address is determined based on the domain name node network address, where the push-to-talk application node is associated with a second geographic service area. The wireless device is then registered in the first geographic service area with the push-to-talk application node associated with the second geographic service area.

DETAILED DESCRIPTION

Figure 1:
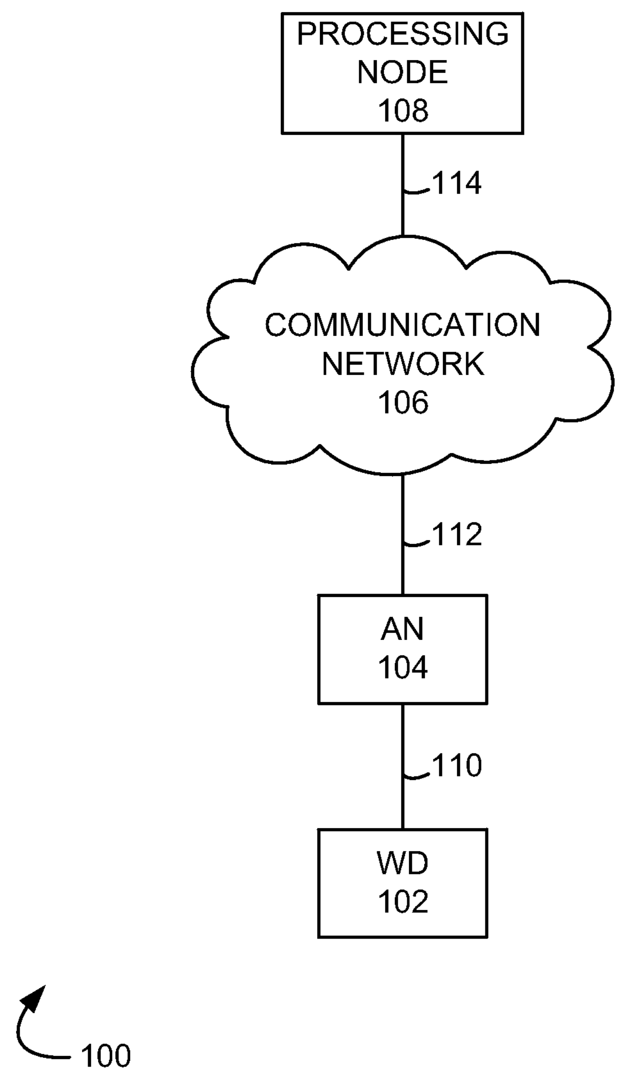
FIG. 1 illustrates an exemplary communication system to manage push-to-talk registration of a wireless device.

FIG. 1 illustrates an exemplary communication system 100 to manage push-to-talk registration of a wireless device comprising wireless device 102, access node 104, communication network 106, and processing node 108. Examples of wireless device 102 can comprise a cell phone, a smart phone, a computing platform such as a laptop, palmtop, or tablet, a personal digital assistant, or an internet access device, including combinations thereof, which are capable of push-to-talk and/or interconnect communication. Wireless device 102 is in communication with access node 104 over communication link 110.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 112.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information and other data, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise a wireless network, including base stations, wireless communication nodes, telephony switches, internet routers, network gateways, computer systems, communication links, or some other type of communication equipment, and combinations thereof. Communication network 106 is in communication with processing node 108 over communication link 114.

Processing node 108 can comprise a processor and associated circuitry to execute or direct the execution of computer-readable instructions, and can be configured to perform functions related to managing push-to-talk registration of a wireless device. Processing node 108 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Processing node 108 can receive instructions and other input at a user interface. Examples of processing node 308 can include a standalone computing device, a computer system, or a network component, such as a dispatch call controller (DCC), a mobile switching center (MSC), a mobility management entity (MME), an access service network gateway (ASN-GW), a packet data network gateway (P-GW), a serving gateway (S-GW), a mobile switching controller (MSC), a packet data serving node (PDSN), call processing equipment, a home agent (HA), a radio node controller (RNC), a subscriber profile system (SPS), authentication, authorization, and accounting (AAA) equipment, and other similar network elements, including combinations thereof.

When a wireless device registers in a push-to-talk communication system, the wireless device is typically registered with an application server in the same geographical region. For example, a wireless device registering with a push-to-talk communication system can be registered to an application server in the same regional network (such as a content delivery network or other regional system) as the wireless device.

The application server can be assigned, for example, by a home agent of the regional network. Where wireless devices participate in a group call, this method of registration can introduce delay (i.e., latency) in call setup and completion processes, which is particularly undesirable in a push-to-talk communication system. For example, where members of a call group are geographically dispersed, when each member of the call group registers with the communication system, each member will typically be registered with an application server in a geographical region of each member, for example, different application service regions or geographic service areas. When a wireless device in the call group initiates a group call, call completion can require the communication system to locate all of the call group members across the various geographic service areas, which can introduce delay in the call setup and completion processes. The larger the call group, the larger the delay which can be introduced.

In operation, a network attachment request is received from wireless device 102, where wireless device 102 is in a first geographic service area. A service plan identifier associated with wireless device 102 is also received. A domain name node network address is provided to wireless device 102 based on the service plan identifier. Based on the domain name node network address, a push-to-talk application node network address is determined. Typically, the push-to-talk application node is associated with a second geographic service area, which is different from the first geographic area. Wireless device 102 is registered with the push-to-talk application node associated with the second geographic service area. In an embodiment, a second wireless device in a third geographic area can be registered with the push-to-talk application node associated with the second geographic service area. In an embodiment, when a group push-to-talk call request for the wireless device is received from the second wireless device (or when the wireless device initiates a group push-to-talk call request for the second wireless device), the wireless device and the second wireless device can be joined in a group push-to-talk call through the push-to-talk application node in the second geographic service area.

Figure 2:
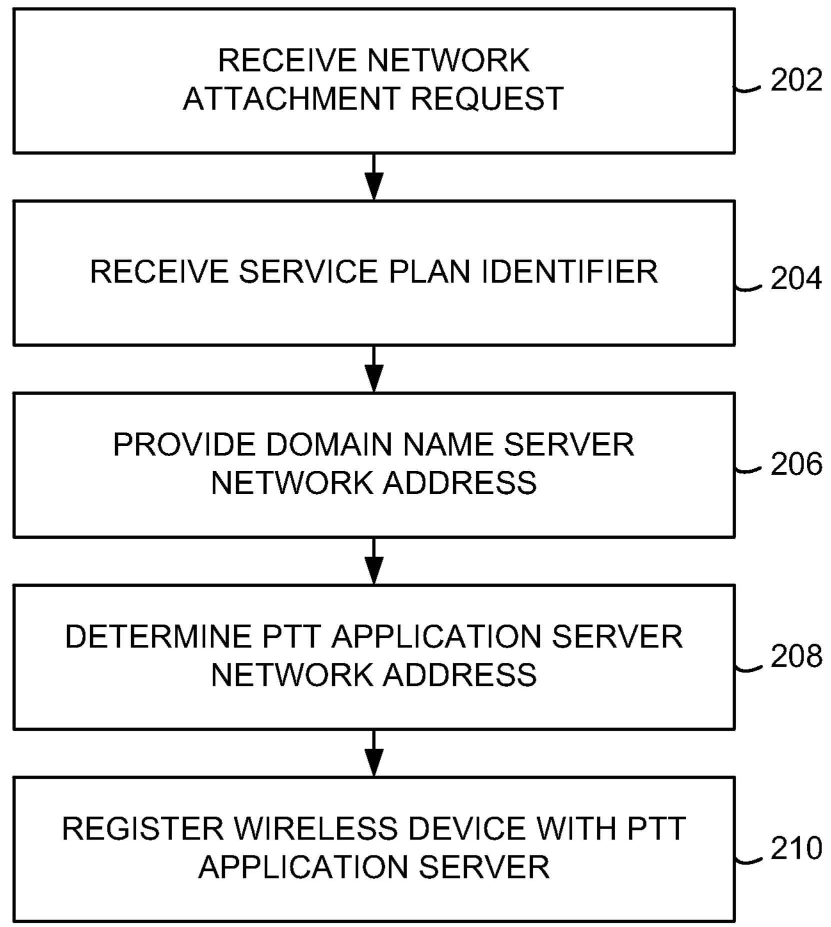
FIG. 2 illustrates an exemplary method of managing push-to-talk registration of a wireless device.

FIG. 2 illustrates an exemplary method of managing push-to-talk registration of a wireless device. In operation 202, a network attachment request is received from a wireless device in a first geographic service area. For example, a network attachment request can be received from wireless device 102, where wireless device 102 is in a first geographic service area. The first geographic service area can comprise a content delivery network or other regional network, which can be assigned by a home agent or similar network element.

In operation 204, a service plan identifier associated with the wireless device is received. For example, when a network attachment request is received from wireless device 102, information identifying a plan attribute of a communication service, a subscription plan, and the like of wireless device 102 can be received. The service plan identifier can comprise, for example, a service order code (SOC), a subscription account number, and the like. The service plan identifier can also comprise a correlation between a wireless device identifier of wireless device 102 and a service plan, a subscription account, a group account, and the like. The service plan identifier can indicate, for example, that wireless device 102 is associated with a group subscription plan, and/or that wireless device 102 may be associated with a push-to-talk call group. In an embodiment, the service plan identifier can be received by a home agent or similar network element in the first geographic service area (i.e., the geographic service area of wireless device 102).

In operation 206, a domain name node network address is provided to the wireless device based on the service plan identifier. For example, when the service plan identifier is received, wireless device 102 can be provided with the network address of a domain name server (DNS) or a similar network element based on the service plan identifier. In embodiments, the domain name node can be in a second geographic service area and/or in the first geographic service area.

In operation 208, a push-to-talk application node network address is determined based on the domain name node network address, wherein the push-to-talk application node is associated with a second geographic service area. For example, a network address of a push-to-talk application server can be determined based on the network address of a domain name server or similar network element provided to wireless device 102. Examples of a push-to-talk application node can comprise a push-to-talk application server, a dispatch application server, a dispatch application processor, and the like. Typically, the push-to-talk application node is associated with the second geographic service area, and not the first geographic service area.

In operation 210, the wireless device is registered with the push-to-talk application node associated with the second geographic service area. For example, based on the determined network address of the push-to-talk application node, wireless device 102 can perform registration with a push-to-talk application node. When wireless device 102 is registered with the push-to-talk application node, wireless device 102 can initiate push-to-talk communication sessions, and further can receive call requests to join or to be connected to push-to-talk communication sessions. Where a communication session is initiated between wireless device 102 and another wireless device, it will be appreciated that call setup and completion processes will be faster and more efficient where both wireless devices are registered with the same push-to-talk application node than where each wireless device is registered with a different push-to-talk application node. In operation 210, wireless device 102 can be registered to a push-to-talk application node in a different geographic service area than where wireless device 102 is geographically located. Further, where geographically diverse wireless devices are registered with a push-to-talk application node in one geographic service area, group call setup and completion processes among the wireless devices can be performed with greater efficiency.

Figure 3:
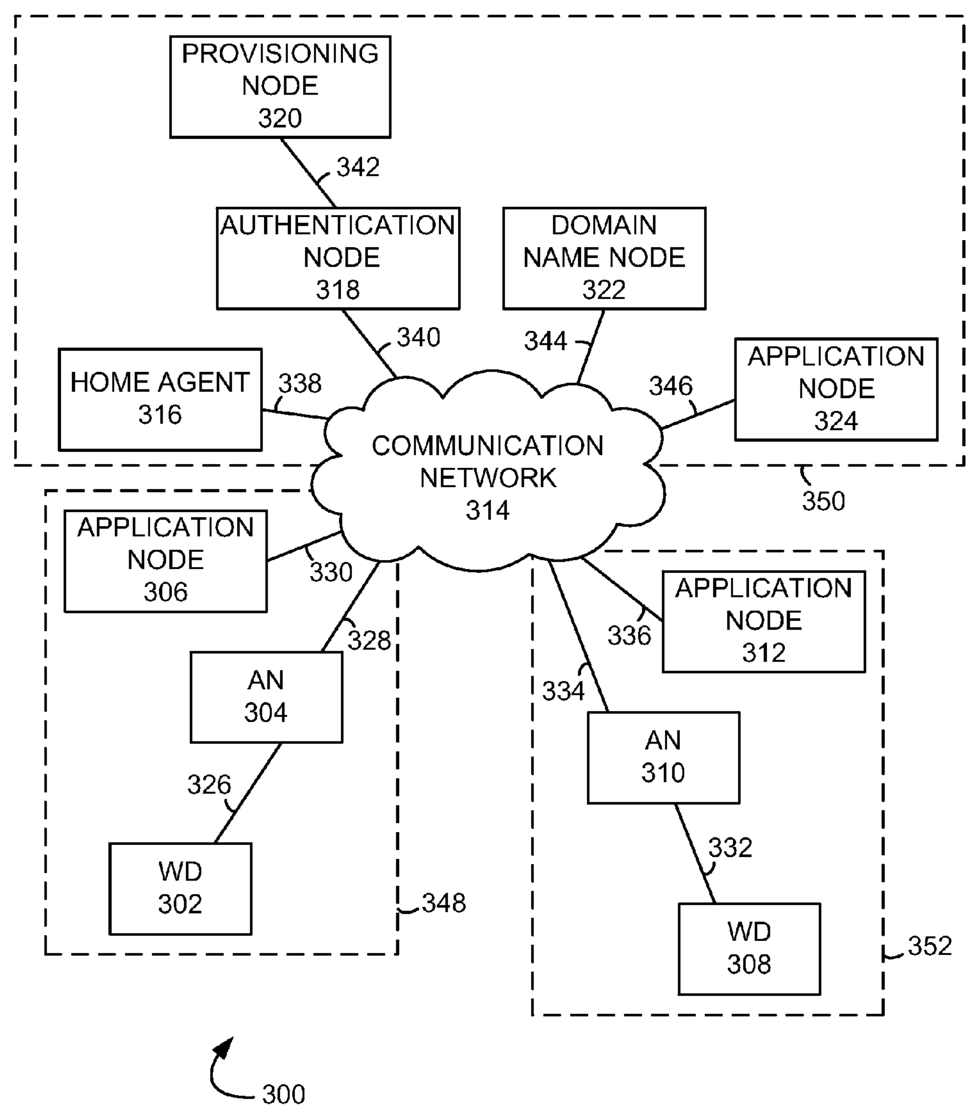
FIG. 3 illustrates another exemplary communication system to manage push-to-talk registration of a wireless device

FIG. 3 illustrates an exemplary communication system 300 to manage push-to-talk registration of a wireless device comprising wireless devices 302 and 308, access nodes 304 and 310, application nodes 306, 312 and 324, communication network 314, home agent 316, authentication node 318, provisioning node 320, and domain name node 322. Wireless device 302, access node 304, and application node 306 are in geographic service area 348, and wireless device, access node 310, and application node 312 are in geographic service area 350. Geographic service areas 348 and 352 comprise distinct geographic service areas from each other, and from geographic service area 350 comprising home agent 316, authentication node 318, provisioning node 320, domain name node 322, and application node 324. Examples of wireless devices 302 and 308 can comprise a cell phone, a smart phone, a computing platform such as a laptop, palmtop, or tablet, a personal digital assistant, or an internet access device, including combinations thereof. Wireless device 302 is in communication with access node 304 over communication link 326, and wireless device 308 is in communication with access node 310 over communication link 332.

Access nodes 304 and 310 are each a network node capable of providing wireless communications to wireless devices 302 and 308, respectively, and can be, for example, a base transceiver station, a radio base station, an eNodeB device, or an enhanced eNodeB device. Access node 304 s in communication with communication network 314 over communication link 328, and access node 310 is in communication with communication network 314 over communication link 334.

Application nodes 306, 312 and 324 can comprise a processor and associated circuitry to execute or direct the execution of computer-readable instructions. An application node can control the setup and maintenance of a communication session over communication network 314 involving a wireless device, such as wireless devices 302 and 308. Application nodes 306, 312 and 324 can be located in distinct geographic service areas 348, 350, and 352. Application nodes 306, 312 and 324 can comprise a dispatch application server (such as a QChat application server, an iDEN application server, and the like), a dispatch call controller (DCC), a mobile switching center (MSC), a mobility management entity (MME), or other similar network node. For dispatch communications, application nodes 306, 312 and 324 can utilize a dispatch communications protocol such as iDEN (Integrated Digital Enhanced Network), QChat, and the like. Application nodes 306, 312 and 324 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Application nodes 306, 312 and 324 can receive instructions and other input at a user interface. Application node 306 is in communication with communication network 314 over communication link 330, application node 312 is in communication with communication network 314 over communication link 336, and application node 324 is in communication with communication network 314 over communication link 346.

Home agent 316 is a network element in communication with communication network 314 over communication link 338. Home agent 316 can be configured to manage information about wireless devices in a communication system. Home agent 316 can comprise a processor and associated circuitry to execute or direct the execution of computer-readable instructions, and can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Home agent 316 can receive instructions and other input at a user interface. Examples of home agent 316 can include a router, a gateway, and the like.

Authentication node 318 is a network element in communication with communication network 314 over communication link 340. Authentication node 318 can be configured to manage authentication of wireless devices, as well as authorizing services available to wireless devices, and performing accounting functions related to the use of services, including network application services and roaming services, by a wireless device. Authentication node 318 can comprise a processor and associated circuitry to execute or direct the execution of computer-readable instructions, and can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Authentication node 318 can receive instructions and other input at a user interface. Examples of authentication node 318 can include an authentication, authorization, and accounting server (AAA), a RADIUS server, a Diameter server, and the like.

Provisioning node 320 is a network element in communication with authentication node 318 over communication link 342. Provisioning node 320 can be configured to manage services and access permissions which can be provisioned for communication system subscribers. Provisioning node 320 can comprise a processor and associated circuitry to execute or direct the execution of computer-readable instructions, and can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Provisioning node 320 can receive instructions and other input at a user interface. Examples of provisioning node 320 can include a subscriber provisioning system server (SPS), a home subscriber server (HSS), a home location register (HLR), and the like.

Domain name node 322 is a network element in communication with communication network 314 over communication link 344. Domain name node 322 can be configured to provide a response to a network location query against a network directory service. Domain name node 322 can comprise a processor and associated circuitry to execute or direct the execution of computer-readable instructions, and can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Domain name node 322 can receive instructions and other input at a user interface. Examples of domain name node 322 can include a domain name server (DNS), or another network node which can provide a response to a network location query.

While FIG. 3 only illustrates home agent 316, authentication node 318, provision node 320, and domain name node 322 in geographic service area 350, this is not intended as limiting, and geographic service areas 348 and 352 can also comprise one or more network elements analogous to those illustrated in geographic service area 350.

Communication links 326, 328, 330, 332, 334, 336, 338, 340, 342, 344 and 346 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 304 and 310, application nodes 306, 312 and 324, communication network 314, home agent 316, authentication node 318, provisioning node 320, and domain name node 322 which are omitted for clarity, including additional processing nodes, routers, gateways, and physical and/or wireless data links for carrying data among the various network elements.

Figure 4:
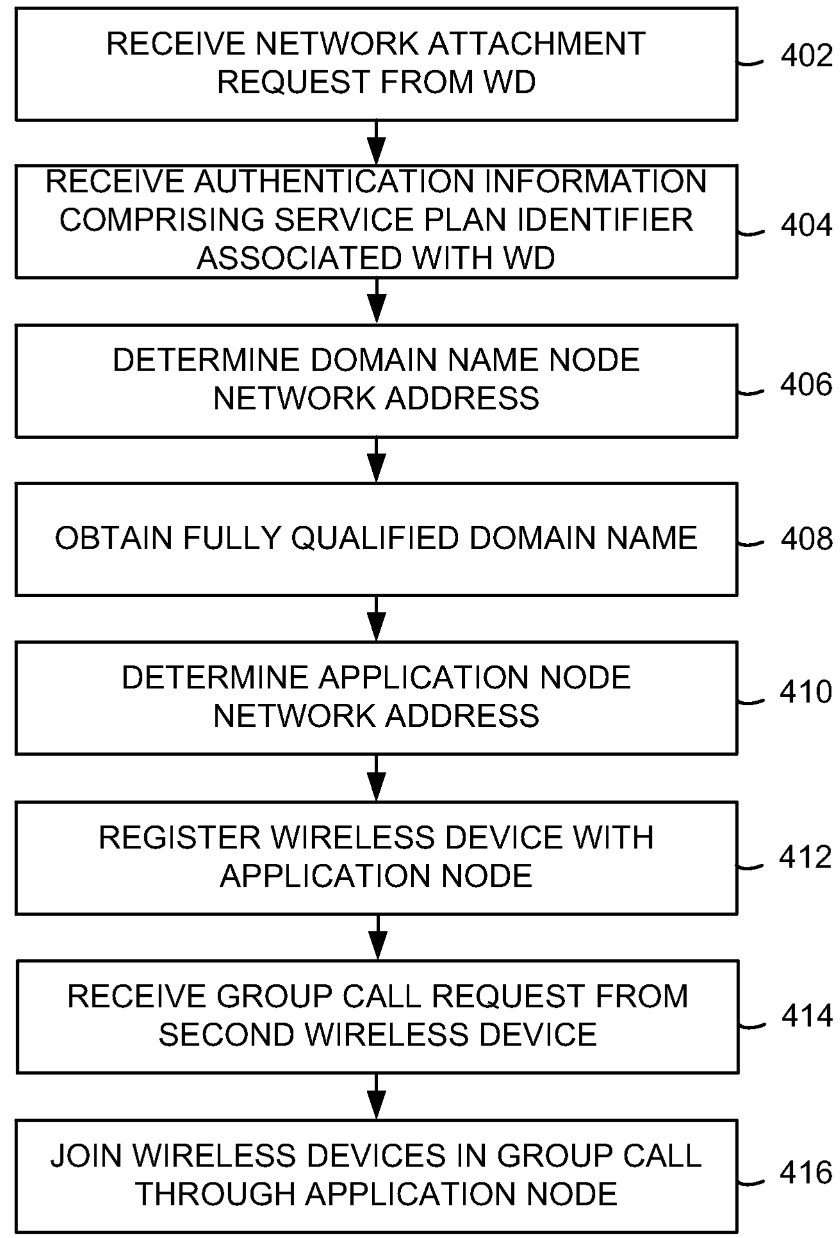
FIG. 4 illustrates another exemplary method of managing push-to-talk registration of a wireless device.

FIG. 4 illustrates another exemplary method of managing push-to-talk registration of a wireless device. In operation 402, a network attachment request is received from a wireless device in a first geographic service area. For example, a network attachment request can be received from wireless device 302, where wireless device 302 is in a first geographic service area 348. First geographic service area 348 can comprise a content delivery network or other regional network, which can be assigned by a home agent or similar network element in geographic service area 348.

In operation 404, authentication information is received based on the network attachment request. In an embodiment, the authentication information can comprise a service plan identifier associated with the wireless device. For example, the network attachment request from the wireless device can be received at home agent 316. Home agent 316 can send a message to authentication node 318 to perform an authentication of wireless device 302, and authentication node 318 can respond to home agent 316 with authentication information for wireless device 302. In an embodiment, authentication node 318 can send a message to provisioning node 320 based on the network attachment request, and provisioning node 320 can provide the service plan identifier to authentication node 318.

In operation 406, a network address of a domain name node is determined. For example, the domain name node network address can be determined based on the service plan identifier. In an embodiment, provisioning node 320 can provide the service plan identifier to authentication node 318, and authentication node 318 can determine the domain name node network address, such as for domain name node 322, based on the service plan identifier. Authentication node 318 can provide the domain name node network address to home agent 316, for example, in an authentication response, or in some other message from authentication node 318 to home agent 316. Home agent 316 can send a message to wireless device 302 comprising the domain name node network address, for example, in a message providing network access authorization to wireless device 302, or in some other message to wireless device 302.

In operation 408, a fully qualified domain name is obtained based on the domain name node network address. For example, when wireless device 302 receives the domain name node network address, wireless device 302 can send a message to domain name node 322 to obtain a fully qualified domain name. The fully qualified domain name can indicate a highly specific location in network, and can be more specific than an IP address or other higher level network location identifier. In an embodiment, the message from wireless device 302 can comprise a pointer record (PTR) query or a similar request.

In an embodiment, the message from wireless device 302 can comprise the domain name node network address. Domain name node 322 can use the domain name node network address to determine a fully qualified domain name. In an embodiment, wireless device 302 can begin a services registration process by sending the message comprising the domain name node network address (such as a DNS IP address) to domain name node 322. Domain name node 322 can resolve the DNS IP address into a fully qualified domain name based on the message. When the fully qualified domain name is obtained, domain name node 322 can provide the fully qualified domain name to wireless device 302.

In operation 410, based on the fully qualified domain name, a network address of an application node can be determined. The application node can be associated with a geographic service area which is different than a geographic service area where the wireless device is located. For example, using the fully qualified domain name, wireless device 302 can send a second message to domain name node 322 to determine the network address of one or more application nodes. Domain name node 322 can respond to wireless device 302 with the network address of one or more application nodes. For example, domain name node 322 can provide the network address of application node 324 in response to the second message from wireless device 302. In an embodiment, application node 324 can be a push-to-talk application node.

In an embodiment, wireless device 302 can send a single message comprising, for example, a pointer record (PTR) query and a service record (SRV) query, or a similar request, including combinations thereof. The message from wireless device 302 can also comprise a sequence of messages, for example, a PTR query followed by a SRV query comprising information returned based on the PTR query.

While wireless device can be located in geographic service area 348, application node 324 can be located in a second geographic service area 350. In an embodiment, the push-to-talk application node network address can be determined based on the fully qualified domain name and a user name associated with wireless device 302. For example, wireless device 302 may be in communication with access node 304 over a short range radio access technology such as WiFi and the like. In such case, the push-to-talk application node network address (e.g., a domain instance of the push-to-talk application node) can be determined based on the fully qualified domain name and a hash of a user name. For example, where a wireless device comprises a user name of user1@domain.com, a query can be sent to a network location based on a hash of the user name, such as domain1.spcdns.net.

In operation 412, the wireless device is registered with the push-to-talk application node associated with the second geographic service area. For example, wireless device 302, using the talk application node network address of application node 324, can register with application node 324. When wireless device 302 is registered with the push-to-talk application node, wireless device 302 can initiate push-to-talk communication sessions, and further can receive a call request to join or to be connected to push-to-talk communication sessions. In an embodiment, the wireless device can be registered with the push-to-talk application node associated with the second geographic service area and with a second push-to-talk application node in the first geographic service area. For example, wireless device 302 can be registered with application node 324 in geographic area 350 and with application node 306 in geographic area 348, and both application nodes 306 and 324 can join wireless device 302 to a push-to-talk communication session.

In operation 414, a push-to-talk call request is received for the wireless device from a second wireless device, and in operation 416 the wireless device and the second wireless device are joined in a group push-to-talk call through the push-to-talk application node in the second geographic service area. For example, a push-to-talk call request can be received from second wireless device 308, intended for wireless device 302, at application node 324. Application node 324 can join wireless devices 308 and 302 in the group call. Wireless device 302 in geographic service area 348, and wireless device 308 in geographic service area 352, can both be registered to application node 324 in geographic service area 350. Where a communication session is initiated between wireless device 302 and wireless device 308, it will be appreciated that call setup and completion processes will be faster and more efficient where both wireless devices are registered with the same push-to-talk application node (e.g., application node 324) than where each wireless device is registered with a different push-to-talk application node (e.g., application nodes 306 and 312, respectively).

The participants in the group call are not limited to wireless devices 302 and 308, and can comprise any number of group call participants. Further, where geographically diverse wireless devices are registered with application node 324 (i.e., groups members other than wireless devices 302 and 308), group call setup and completion processes among the wireless devices can be performed with greater efficiency and speed.

Figure 5:
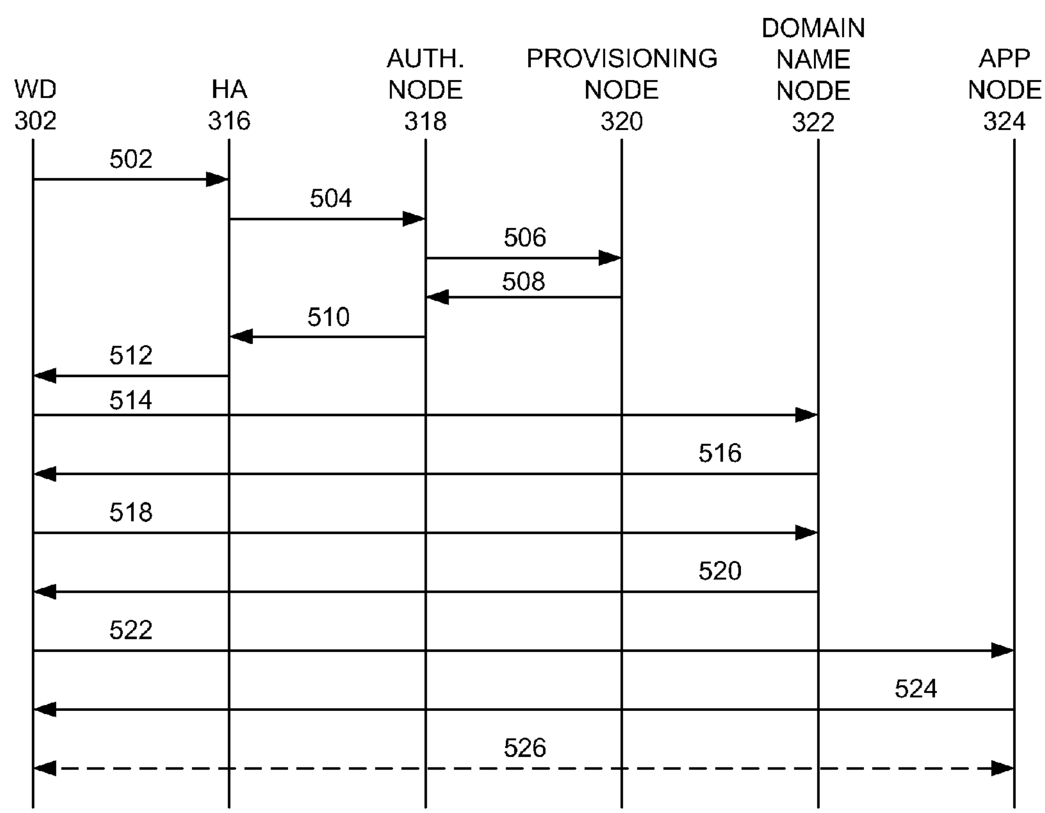
FIG. 5 illustrates an exemplary data flow of a method of managing push-to-talk registration of a wireless device.

FIG. 5 illustrates an exemplary data flow of a method of managing push-to-talk registration of a wireless device. In operation, a network attachment request 502 is received at home agent 316 from wireless device 302 in a first geographic service area (for example, geographic service area 348). Home agent 316 sends an authentication request 504 to authentication node 318, and authorization node 318 sends a request for user profile information 506 associated with wireless device 302 to provisioning node 320. User profile information can comprise a service plan identifier associated with wireless device 302. The service plan identifier can comprise, for example, information identifying a plan attribute of a communication service, a subscription plan, a service order code (SOC), a subscription account number, and the like of wireless device 302. Provisioning node 320 provides the user profile information 508 to authorization node 318.

Based on the user profile information, a network address of domain name node 322 is determined at authorization node 318. For example, authentication node 318 can determine the domain name node network address based on the service plan identifier in user profile information 506. Authentication node 318 provides the domain name node network address 510 to home agent 316 (which can be, for example, in an authentication response, or in some other message from authentication node 318 to home agent 316). Home agent 316 sends message 512 to wireless device 302 comprising the network address of domain name node 322. In an embodiment, message 512 comprises a message providing network access authorization to wireless device 302.

When wireless device 302 receives the domain name node network address, wireless device 302 sends a message 514 to domain name node 322 to obtain a fully qualified domain name of application node 324. The message can comprise, for example, a pointer record (PTR) query or a similar request, and can further comprise the domain name node network address. Domain name node 322 can use the domain name node network address to determine the fully qualified domain name. In an embodiment, wireless device 302 can begin a services registration process by sending message 514 comprising the domain name node network address, such as a DNS IP address, to domain name node 322. Domain name node 322 can resolve the DNS IP address into a fully qualified domain name. The fully qualified domain name can indicate a highly specific location in network, and can be more specific than an IP address or other higher level network location identifier. When the fully qualified domain name is obtained, domain name node 322 can provide the fully qualified domain name to wireless device 302 (message 520).

Based on the fully qualified domain name, a network address of application node 324 can be determined. Application node 324 can be associated with a geographic service area (such as geographic area 350) which is different than a geographic service area where the wireless device is located (i.e., geographic area 348). Using the fully qualified domain name, wireless device 302 can send a second message 518 to domain name node 322 to determine the network address of one or more application nodes. Domain name node 322 can respond to wireless device 302 with the network address of one or more application nodes (message 520). For example, domain name node 322 can provide the network address of application node 324 in response to the second message from wireless device 302. In an embodiment, application node 324 can be a push-to-talk application node. In an embodiment, the push-to-talk application node network address can be determined based on the fully qualified domain name and a user name associated with wireless device 302 (which can be a hash of the user name associated with wireless device 302).

In an embodiment, message 518 can comprise a pointer record (PTR) query or similar message, and message 518 can comprise a service record (SRV) query or a similar message. In an embodiment, wireless device 302 can send a single message comprising, for example, a pointer record (PTR) query and a service record (SRV) query, or a similar request, including combinations thereof.

Using the application node network address of application node 324, wireless device 302 can send a registration request 522 to register for push-to-talk service with application node 324. Application node 324 can respond with an indication that wireless device 302 has been successfully registered for push-to-talk service with application node 324 (message 524) When wireless device 302 is registered with application node 324, wireless device 302 can initiate push-to-talk communication sessions, and further can receive call requests to join or to be connected to push-to-talk communication sessions (indicated as bidirectional communication 526).

In an embodiment, a push-to-talk call request is received for the wireless device from a second wireless device at application node 324, and wireless device 302 and the second wireless device are joined in a group push-to-talk call through application node 324. For example, a push-to-talk call request can be received from a second wireless device (such as wireless device 308) for wireless device 302 at application node 324. Application node 324 can join wireless devices 308 and 302 in the group call. Where geographically diverse wireless devices are registered with application node 324, group call setup and completion processes among the wireless devices can be performed with greater efficiency and speed.

Figure 6:
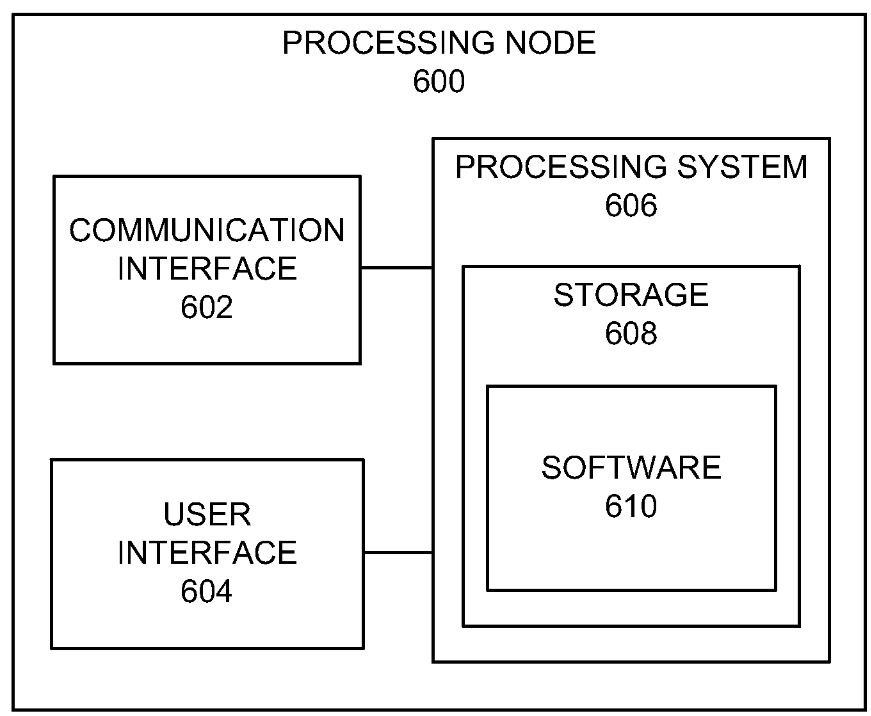
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to manage push-to-talk registration of a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access node 104, processing node 108, home agent 316, authentication node 318, provisioning node 320, domain name node 322, and application node 324. Processing node 600 can also be an adjunct or component of a network element of a communication system, and further, the functionality of processing node 600 can be distributed across two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of managing push-to-talk registration of a wireless device, comprising:

receiving a network attachment request from a wireless device in a first geographic service area;

receiving a service plan identifier associated with the wireless device;

providing a domain name node network address to the wireless device based on the service plan identifier;

determining a push-to-talk application node network address based on the domain name node network address, wherein the push-to-talk application node is associated with a second geographic service area; and registering the wireless device with the push-to-talk application node associated with the second geographic service area.

2. The method of claim 1, further comprising:

receiving the network attachment request from the wireless device at a home agent; and receiving authentication information at the home agent from an authentication node, wherein the authentication information comprises the domain name node network address.

3. The method of claim 2, further comprising:

receiving authentication information at the home agent from an authentication node, wherein the authentication node determines the domain name node network address based on the service plan identifier.

4. The method of claim 1, wherein determining a push-to-talk application node network address further comprises:

obtaining a fully qualified domain name based on the domain name node network address; and determining the push-to-talk application node network address based on the fully qualified domain name.

5. The method of claim 4, further comprising:

obtaining a fully qualified domain name based on the domain name node network address; and determining the push-to-talk application node network address based on the fully qualified domain name and a hash of a user name.

6. The method of claim 1, wherein the first geographic service area is associated with a second push-to-talk application node.

7. The method of claim 6, further comprising registering the wireless device in the first geographic service area with the push-to-talk application node associated with the second geographic service area and with the second push-to-talk application node in the first geographic service area.

8. The method of claim 7, further comprising:

receiving a group push-to-talk call request for the wireless device from a second wireless device; and joining the wireless device and the second wireless device in a group push-to-talk call through the push-to-talk application node associated with the second geographic service area.

9. The method of claim 8, wherein the second wireless device is associated with a third geographic service area.

10. A system of managing push-to-talk registration of a wireless device, comprising: a processing node configured to:

receive a network attachment request from a wireless device in a first geographic service area;

receive a service plan identifier associated with the wireless device; and provide a domain name node network address to the wireless device based on the service plan identifier, wherein a push-to-talk application node network address is determined based on the domain name node network address, and wherein the push-to-talk application node is associated with a second geographic service area.

11. The system of claim 10, further comprising:

a second processing node configured to provide the push-to-talk application node network address to the wireless device to enable the wireless device to register with the push-to-talk application node associated with the second geographic service area.

12. The system of claim 11, wherein the processing node is further configured to provide authentication information to the wireless device, wherein the authentication information a network address of the second processing node.

13. The system of claim 12, further comprising a third processing node configured to determine the second processing node network address based on the service plan identifier, and to provide the second processing node network address to the processing node.

14. The system of claim 11, wherein the second processing node is further configured to:

obtain a fully qualified domain name based on the second processing node network address; and determine the push-to-talk application node network address based on the fully qualified domain name.

15. The system of claim 11, wherein the second processing node is further configured to:

obtain a fully qualified domain name based on the second processing node network address; and determine the push-to-talk application node network address based on the fully qualified domain name and a hash of a user name.

16. The system of claim 10, wherein the first geographic service area is associated with a second push-to-talk application node.

17. The system of claim 16, wherein the wireless device in the first geographic service area is registered with the push-to-talk application node associated with the second geographic service area and with a second push-to-talk application node associated with the first geographic service area.

18. The system of claim 17, wherein the push-to-talk application node is further configured to:

receive a group push-to-talk call request for the wireless device from the second wireless device; and join the wireless device and the second wireless device in a group push-to-talk call through the push-to-talk application node in the second geographic service area.

19. The method of claim 18, wherein the second wireless device is associated with a third geographic service area.

* * * * *